United States Patent [19]
Kim

[11] Patent Number: 6,072,892
[45] Date of Patent: Jun. 6, 2000

[54] EYE POSITION DETECTING APPARATUS AND METHOD THEREFOR

[75] Inventor: Seong-Beom Kim, Seoul, Rep. of Korea

[73] Assignee: Daewoo Electronics Co., Ltd., Rep. of Korea

[21] Appl. No.: 09/054,687

[22] Filed: Apr. 3, 1998

[30] Foreign Application Priority Data

Aug. 20, 1997 [KR] Rep. of Korea ................. 97-39611

[51] Int. Cl.[7] .............................................. G06K 9/00
[52] U.S. Cl. ..................................... 382/117; 382/118
[58] Field of Search .................................... 382/115, 116, 382/117, 118, 170, 172, 207; 351/210; 345/134; 340/825.34

[56] References Cited

U.S. PATENT DOCUMENTS 5,218,387  6/1993  Ueno et al. .
5,432,862  7/1995  Hirsch ..................................... 382/207
5,481,622  1/1996  Gerhardt et al. .
5,859,921  1/1999  Suzuki ..................................... 382/118
5,867,610  2/1999  Lee ........................................ 382/283

*Primary Examiner*—Amelia Au
*Assistant Examiner*—Vikkram Bali
*Attorney, Agent, or Firm*—Anderson Kill & Olick

[57] ABSTRACT

An eye position detecting apparatus for detecting an eye position in a facial image utilizes a histogram thereof, wherein the facial image contains a plurality of pixels each of which is represented by a grey level value. The eye position detecting apparatus includes a window generator for windowing the facial image, a histogram extractor for extracting a histogram from the windowed facial images, a peak detector for detecting peaks of the histogram and for comparing the number of the peaks with 3, an area calculator for calculating the areas of the histogram for each of the windowed facial images when the number is equal to 3 and a selector for selecting a largest area among the calculated areas and determining the eye position by using largest area.

2 Claims, 6 Drawing Sheets

EYE POSITION DETECTING APPARATUS AND METHOD THEREFOR

FIELD OF THE INVENTION

The present invention relates to an apparatus for detecting an eye position; and, more particularly, to an apparatus which detects an eye position in a face image based on a histogram thereof.

DESCRIPTION OF THE PRIOR ART

As is well known, human faces may often be distinguished by their features such as eyes, nose, mouth and face profile. Among those, the eyes are the distinctest features on the face. However, the extracting the eye positions which can provide highly reliable discrimination is a difficult task.

An eye position detecting system with an infrared ray has been introduced to solve the problem.

In FIG. 1, there is shown a prior art eye position detecting system 10, disclosed in U.S. Pat. No. 5,293,427, entitled "EYE POSITION DETECTING SYSTEM AND METHOD THEREFOR". The eye position detecting system 10 includes an infrared strobe 12, a TV camera 14, an A-D convertor 16, an image memory 18, an eye window detecting section 20, an iris detecting section 22, an inattentive drive discriminating section 24 and a timing circuit 26.

In the system 10, the infrared strobe 12 transmits infrared rays to a driver's face. The TV camera 14 takes facial images irradiated by the infrared rays. The timing circuit 26 matches the timing at which the infrared rays are emitted from the infrared strobe 12 with that at which the facial images are taken by the TV camera 14. The A-D convertor 16 converts analog image signals obtained by the TV camera 14 into digital image signals, and the image memory 18 stores these digital image signals. The eye window detecting section 20 detects an area or areas within which two eyes exist on the basis of the image signal stored in the image memory 18. The iris detecting section 22 detects an iris position by processing the image signals within the area detected by the eye window detecting section 20. The inattentive drive discriminating section 24 discriminates the presence or absence of inattentive driving, e.g., a doze or looking aside, on the basis of the result detected by the iris detecting section 24.

There is a number of problems associated with the above-described eye position detecting system 10, however. First of all, the infrared strobe 12 for irradiating infrared rays must be incorporated into the eye position detecting system 10.

Another problem present in the prior eye position detecting system 10 is that it requires a binarization of the image from which the eye position is determined.

SUMMARY OF THE INVENTION

It is, therefore, a primary object of the invention to provide an apparatus for effectively determining an eye position in a facial image based on a histogram therefor.

In accordance with the present invention, there is provided an apparatus for detecting an eye position in a facial image containing a plurality of pixels each of which is represented by a grey level value, which comprises: a filter for filtering the facial image to obtain a filtered facial image by removing noises in the facial image; a window generator for windowing the filtered facial image, wherein the window generator scans across the entire facial image by using a raster scanning method; a histogram extractor for extracting histograms from the windowed facial images, wherein the histogram is obtained by plotting frequencies of pixels in the windowed facial image as a function of grey level values; a peak detector for detecting peaks of the histograms, wherein the peak detector regards a local maximum of the histogram of which corresponding frequency is larger than a predetermined threshold as a peak; an area calculator for calculating the areas of the histogram for each of the windowed facial images when the number is equal to 3; and a selector for selecting a largest area among the calculated areas and determining the eye position by using the largest area.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
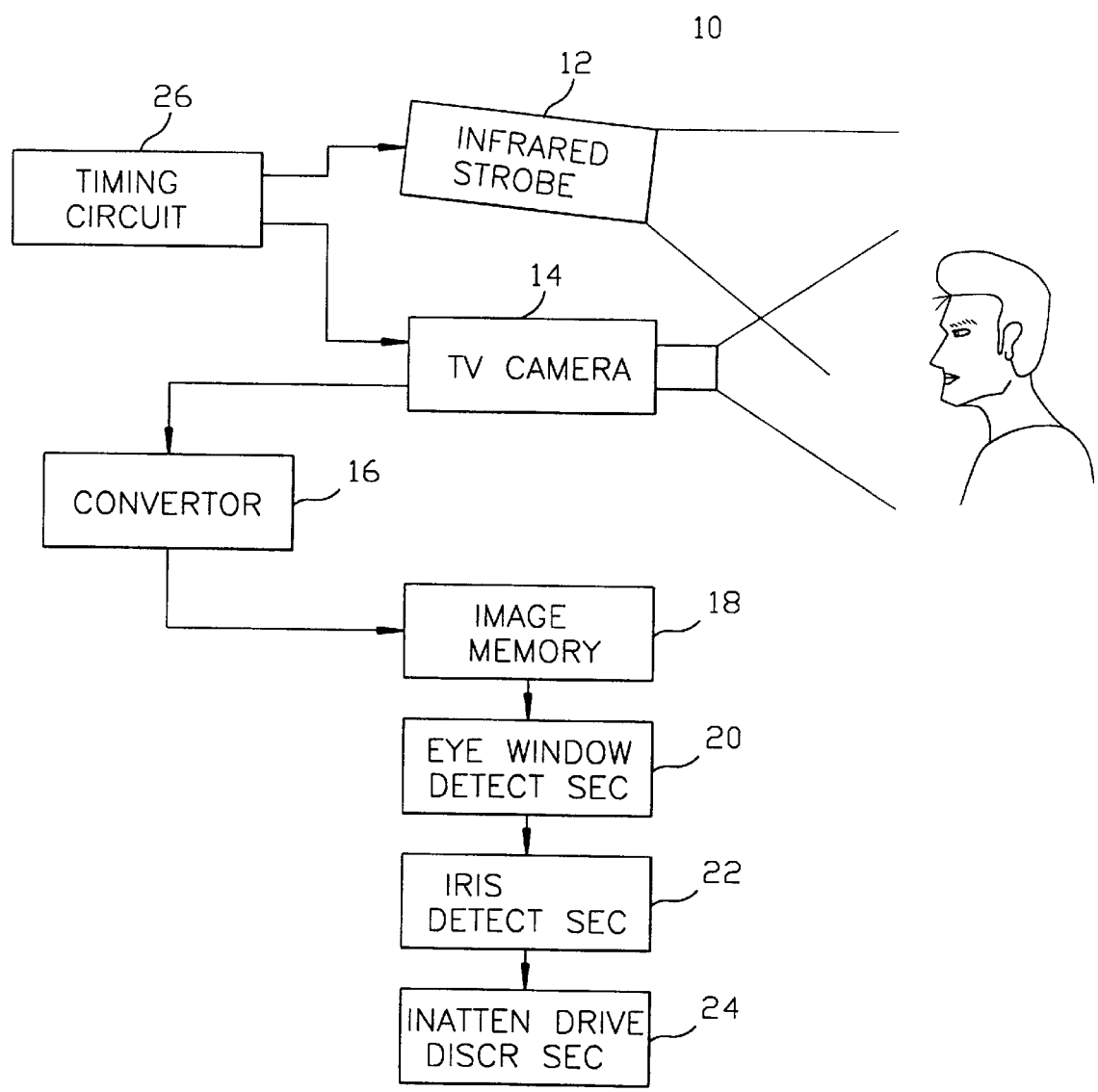
FIG. 1 illustrates a schematic block diagram of a prior art eye position detecting apparatus.
Figure 2:
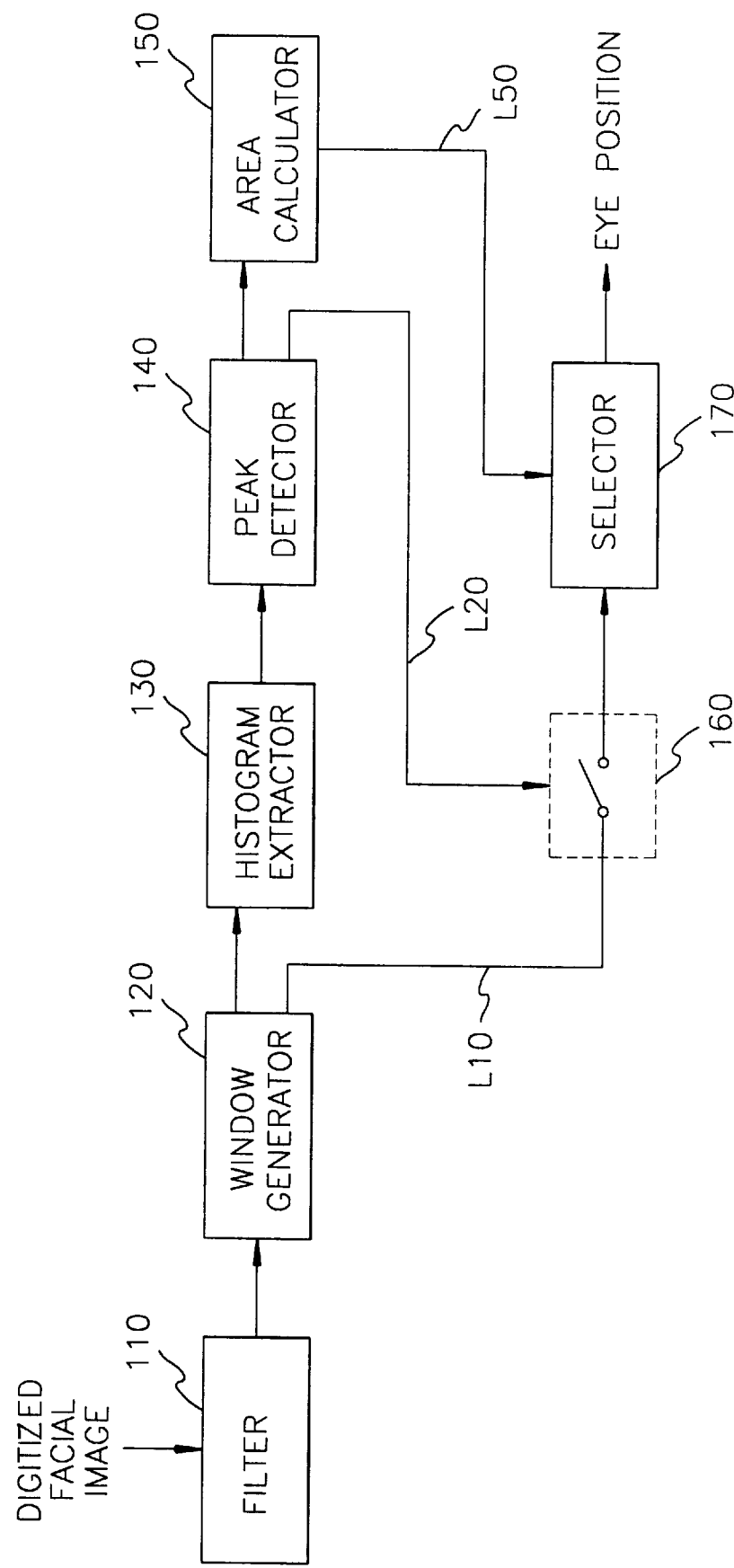
FIG. 2 represents a schematic block diagram of an eye position detecting apparatus in accordance with the present invention.

Referring to FIG. 2, there is shown a schematic block diagram of an eye position detecting apparatus 100 in accordance with the present invention. The apparatus 100 comprises a filter 110, a window generator 120, a histogram extractor 130, a peak detector 140, an area calculator 150, a switch 160 and a selector 170.

Figure 3:
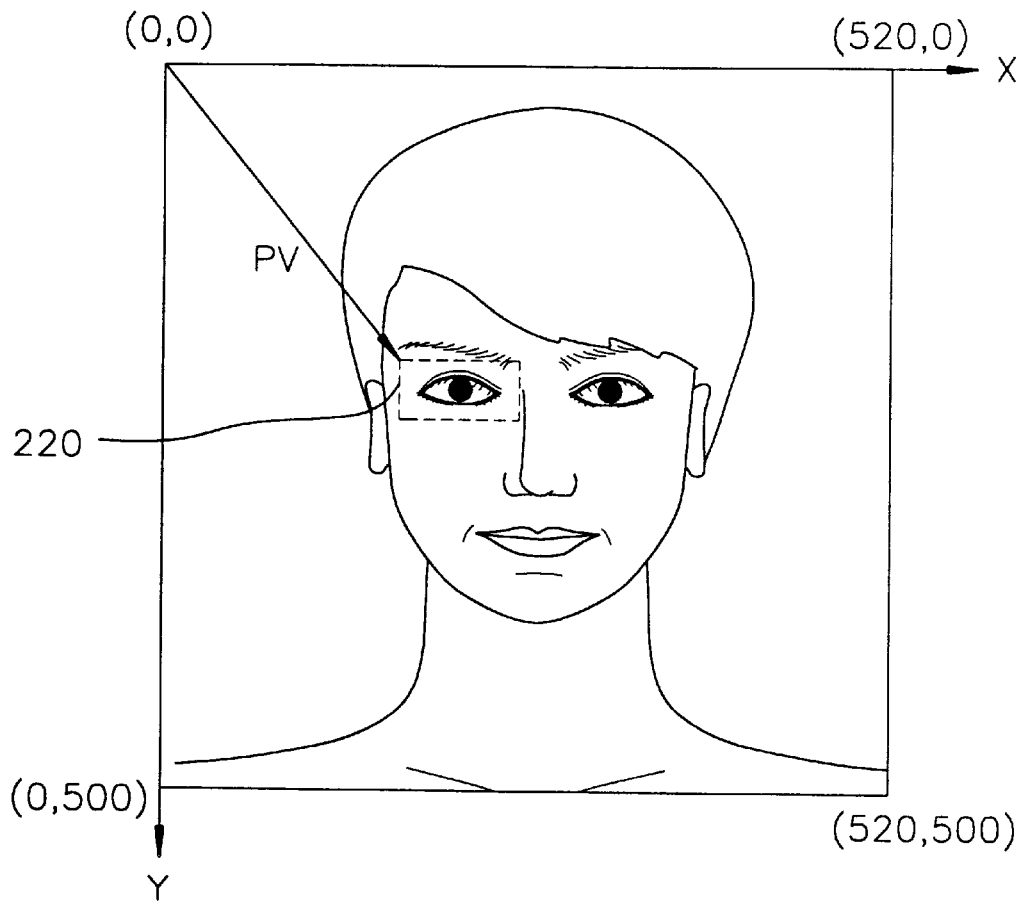
FIG. 3 is an illustration explaining a facial image including a search window.

The invention is primarily directed to a facial image, wherein the facial image is taken e.g., by a television camera(not shown). An exemplary facial image 200 shown in FIG. 3, is composed of 520 and 500 pixels along X and Y directions, respectively and the field angle of the facial image 200 is so adjusted that the whole face can appear full in the face image 200. Before the facial image 200 is fed to the filter 110 as the input facial image, the facial image 200 is converted into a digitized facial image by an A-D convertor(not shown).

At the filter 110, the digitized input facial image is pre-processed to be applied to subsequent processes. Specifically, the filter 110 is used to obtain a filtered image by removing noises, e.g., impulse noises, contained in the input image. A cross-shaped median filter may be used to reduce small amounts of noise, wherein the filtering process is performed on a pixel-by-pixel basis. Other lowpass filters known in the art may be used for the same purpose.

The filtered image from the filter 110 is fed to the window generator 120, which sequentially generates search windows in the filtered image to the histogram extractor 130, wherein a search window 220 in the preferred embodiment of the present invention is of a rectangular form. In the preferred embodiment of the present invention, the window generator 120 scans the entire filtered image by using a raster scanning method. The window generator 120 also provides a position vector(PV) representing the position of each search window to the switch 160 via a line L10.

Figure 5:
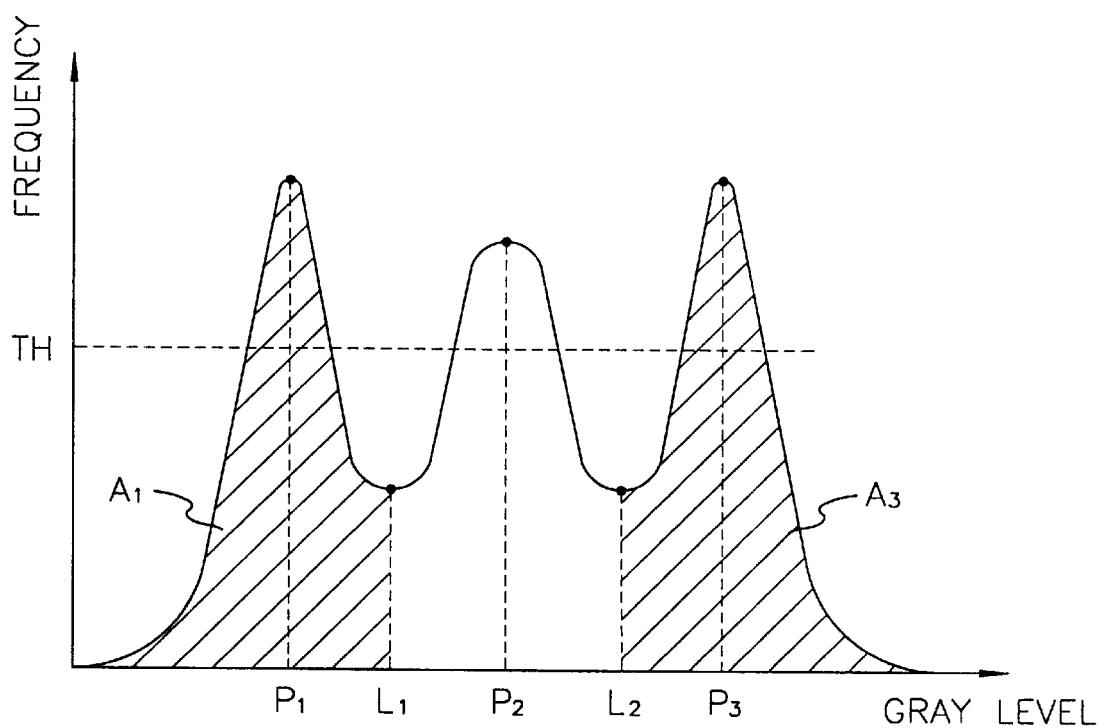
FIG. 5 depicts a histogram of the search window shown in FIG. 4.

The histogram extractor 130 extracts a histogram of the filtered image included in each search window from the window generator 120, wherein a histogram of a search window is obtained by plotting frequencies of pixels of the filtered image within the search window as a function of grey level values. At the histogram extractor 130, the number of pixels in the search window, assuming each of the gray levels, e.g., 0 to 255, is counted, to thereby provide a frequency for each grey level value. In FIG. 5, there is shown an exemplary histogram, wherein the horizontal axis represents the gray levels and the vertical axis corresponds to the frequency of pixels having each grey level in the search window.

The histogram obtained by the histogram detector 130 is fed to the peak detector 140 wherein peaks, e.g., three peak points P1, P2 and P3 shown in FIG. 5, are detected within the range of grey level 0 to 255. Prior to detecting peaks, the histogram may be smoothed, i.e., small fluctuations in the histogram are suppressed by averaging them. A peak of a histogram may be defined as a cluster of grey levels that encloses a peak point, e.g., P1, which is a local maximum of a histogram and its corresponding frequency is larger than a predetermined threshold (TH). The predetermined threshold may be determined as an average frequency of the pixels in the histogram, which is represented as TH in FIG. 5. The presence of a peak indicates that a certain cluster of grey levels appears far more frequently than the others in an input image.

Figure 4:
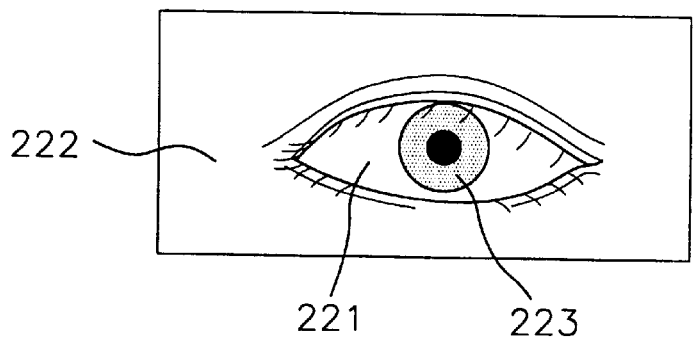
FIG. 4 shows the search window enclosing an eye pupil and an eye white shown in FIG. 3.

The peak detector 140 finds as a candidate window a search window, e.g., the window 220 shown in FIG. 4, which spans or encloses an eye pupil 223 and an eye white 221. The candidate window may be divided into three regions due to distinct contrast between the eye white 221, the eye pupil 223 and a skin 222. Therefore, in case when the number of the peaks detected in the peak detector 140 is equal to 3, the peak detector 140 regards the search window 220 having 3 peaks as a candidate window; and provides the histogram and the peak information of the candidate window to the area calculator 150 and a switch signal representing that the search window is a candidate window to the switch 160 via a line L20; wherein the peak information includes pixel values corresponding to the peaks in the histogram. In response to the switch signal, the switch 160 connects the line L10 from the window generator 120 to the selector 170 to thereby provide with the selector 170 with a position vector corresponding to the candidate window.

At the area calculator 150, two peaks, e.g., peak $P_1$ and $P_2$ shown in FIG. 5, having the minimum and the maximum pixel values are identified first among three peaks of a histogram for a candidate window. Thereafter, the area calculator 150 calculates the area $A_1$ including the first peak $P_1$ and the area $A_3$ including the third peak $P_3$. The areas $A_1$ and the $A_3$ represent the numbers of pixels between 0 and $L_1$ and between $L_2$ and 255, respectively, wherein the $L_1$ corresponds to a pixel value having a least frequency between the peak points $P_1$ and $P_2$ and the $L_2$ corresponds to a pixel value having a smallest frequency between the peak points $P_2$ and $P_3$. And then, the area calculator 150 calculates the sum area $A_T$ of the areas ($A_1$ and $A_3$) to send it to the selector 170 via a line L50, wherein the areas $A_1$ and $A_3$ are regarded as the numbers of pixels in the eye pupil 223 and the eye white 221, respectively.

The selector 170 detects a largest sum area among sum areas for all candidate windows obtained from the input facial image and outputs, as an eye position for the input facial image, a position vector(PV) corresponding to a candidate window having the detected largest sum area.

Figure 6A:
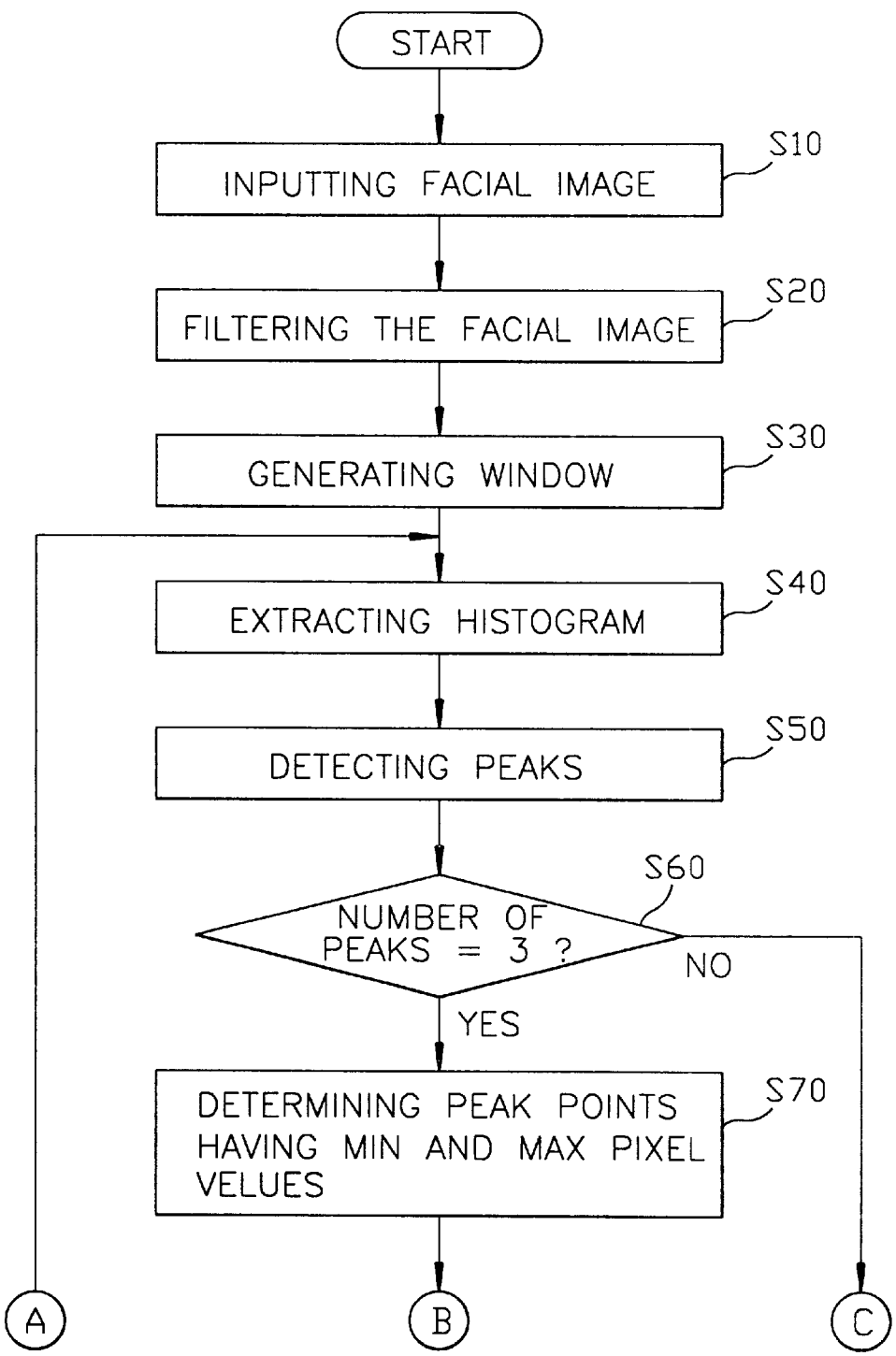
FIGS. 6A and 6B present a flow chart explaining the operation of the eye position detecting apparatus shown in FIG. 2.
Figure 6B:
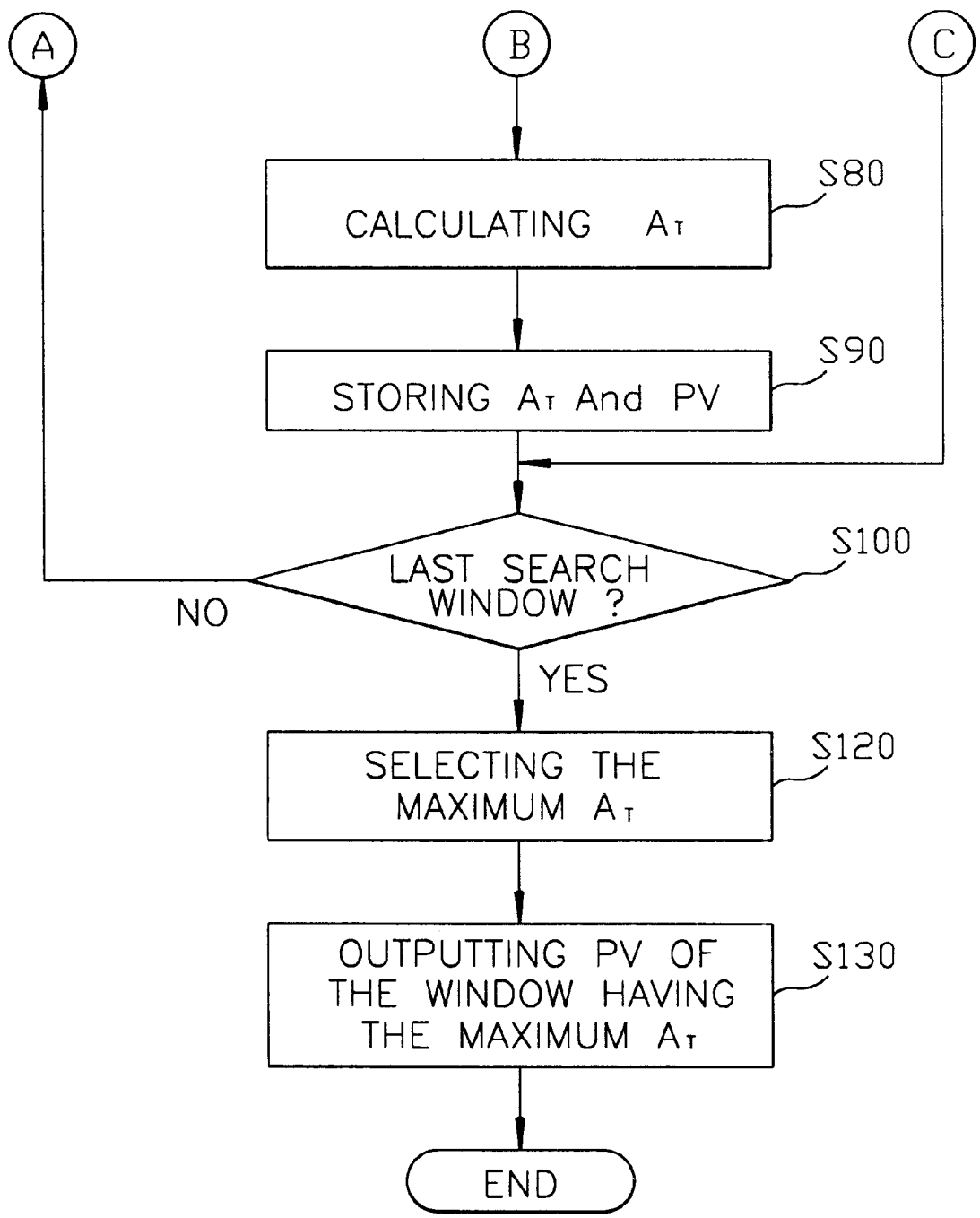

With reference to FIGS. 6A and 6B, the method for determining an eye position in a facial image in accordance with the present invention will now be described in detail. At step S10, the facial image inputted is fed to the eye position detecting apparatus 100 and the process goes to step S20. At step S20, the filter 110 filters the facial image and the process goes to step S30. At step S30, the filtered image from the filter 110 is fed to the window generator 120 which sequentially generates search windows and position vectors(PV's) of the search windows by scanning the entire filtered image in a raster scanning fashion. At step S40, the histogram extractor 130 extracts a histogram from the filtered image within each search window. And then, at a following step S50, the peak detector 140 finds peaks in the histogram and the process goes to step S60.

At step S60, the peak detector 140 checks if the number of the peaks in the histogram is equal to 3. If the comparison result is YES, the corresponding search window is determined as a candidate window and the process goes to S70, and if not, it goes to step S100.

At step S70, the area calculator 150 finds two peak points corresponding to the maximum and the minimum pixel values among three peak points for each candidate window. At step S80, the area calculator 150 calculates a sum area $A_T$, wherein the sum area $A_T$ is the total number of pixels within the peaks including two peak points formed at step S70. At step S90, the sum area $A_T$ and a PV for each candidate window are stored at the selector 170 and the process goes to step S100.

At step S100, it is checked whether all search windows for the entire facial image is process. If the check result is negative, the process returns to step S40. If affirmative, the selector 170 selects a maximum $A_T$ among the $A_T$'s of the candidate windows for the entire image at step S120. Subsequently, at step S130, the selector 170 outputs the position vector corresponding to the candidate window having the maximum $A_T$, and the whole process is terminated.

While the present invention has been shown and described with reference to the particular embodiments, it will be apparent to those skilled in the art that many changes and modifications may be made without departing from the spirit and scope of the invention as defined in the appended claims.

What is claimed is:

1. A method for detecting an eye position in a facial image by using a histogram therefor, wherein the facial image contains a plurality of pixels each of which is represented by a grey level value, the method comprising the steps of:

(a) filtering the facial image to thereby obtain a filtered facial image;

(b) generating a window within the filtered facial image;

(c) extracting a histogram from the window;

(d) detecting peaks of the histogram;

(e) comparing the number of peaks with 3, wherein if the number is equal to 3, the window is regarded as a candidate window;

(f) determining two peaks having a maximum and a minimum pixel values among the three peaks of the candidate window;

(g) calculating an $A_T$ of the candidate window, wherein the $A_T$ is a sum of $A_{MAX}$ and $A_{MIN}$, and the $A_{MAX}$ represents the pixel number in a region enclosing the peak having the maximum pixel value and the $A_{MIN}$ represents the pixel number in a region enclosing the peak having the minimum pixel value;

(h) storing the $A_T$'s for the candidate windows and corresponding position vectors; and (1) selecting a largest $A_T$ among the stored $A_T$'s and outputting a corresponding position vector as the eye position.

2. The method of claim 1, wherein in case when both sides of eye positions are selected, position vectors corresponding to two maximum $A_T$'s among the $A_T$'s are outputted as the both sides of the eye positions.

* * * * *